(12) United States Patent
Hariri et al.

(10) Patent No.: US 7,092,498 B2
(45) Date of Patent: Aug. 15, 2006

(54) UNIVERSAL POINT OF CONTACT IDENTIFIER SYSTEM CALLING DEVICE AND METHOD

(75) Inventors: Ayman Hariri, Potomac, MD (US); Scott D. Birnbaum, Washington, DC (US); Stephen B. Green, Silver Spring, MD (US); Davis Edgar McPherson, Silver Spring, MD (US); William Nigel Simmons, Potomac, MD (US)

(73) Assignee: Ayman, LLC, Bethesda, MD (US)

( * ) Notice: Subject to any disclaimer, the term of this patent is extended or adjusted under 35 U.S.C. 154(b) by 351 days.

(21) Appl. No.: 10/304,018

(22) Filed: Nov. 26, 2002

(65) Prior Publication Data

US 2003/0118175 A1    Jun. 26, 2003

Related U.S. Application Data

(60) Provisional application No. 60/332,537, filed on Nov. 26, 2001.

(51) Int. Cl.
*H04M 11/00* (2006.01)
(52) U.S. Cl. .................. 379/93.01; 379/93.24; 379/201.01
(58) Field of Classification Search ............ 379/93.01, 379/201.01, 201.02, 207.01, 211.01, 211.02, 379/93.26, 93.24
See application file for complete search history.

(56) References Cited

U.S. PATENT DOCUMENTS

| 4,649,563 | A | 3/1987 | Riskin |
| 4,817,129 | A | 3/1989 | Riskin |
| 6,343,118 | B1 | 1/2002 | Haster |
| 6,370,149 | B1 | 4/2002 | Gorman et al. |
| 6,370,399 | B1 | 4/2002 | Phillips |
| 2001/0012285 | A1 | 8/2001 | Shaharabani et al. |
| 2001/0023400 | A1 | 9/2001 | Kurganov et al. |
| 2002/0072395 | A1 | 6/2002 | Miramontes |
| 2002/0122546 | A1 | 9/2002 | Brogne et al. |
| 2002/0122547 | A1 | 9/2002 | Hinchey et al. |

FOREIGN PATENT DOCUMENTS

| EP | 1 011 273 A2 | 6/2000 |
| WO | WO 91/07838 | 5/1991 |
| WO | WO 02/073984 A1 | 9/2002 |

*Primary Examiner*—Stella Woo
(74) *Attorney, Agent, or Firm*—Sughrue Mion, PLLC

(57) ABSTRACT

A universal point of contact identifier system calling device facilitates a connection between a caller and a call recipient over a telephone network by communicating with a universal point of contact identifier system server. The calling device includes a keyboard, a display, a circuit to make a telephone call and transmit and receive digital data over the network, a memory unit and a micro-controller to control the functions of the device. The keyboard facilitates the entry of an identifier, e.g., an email address, into the memory unit of the device. After entry of the identifier, the circuit connects the device with the server and transmits the identifier to the server. The server utilizes the identifier to establish a connection over the network between the caller and call recipient.

45 Claims, 5 Drawing Sheets

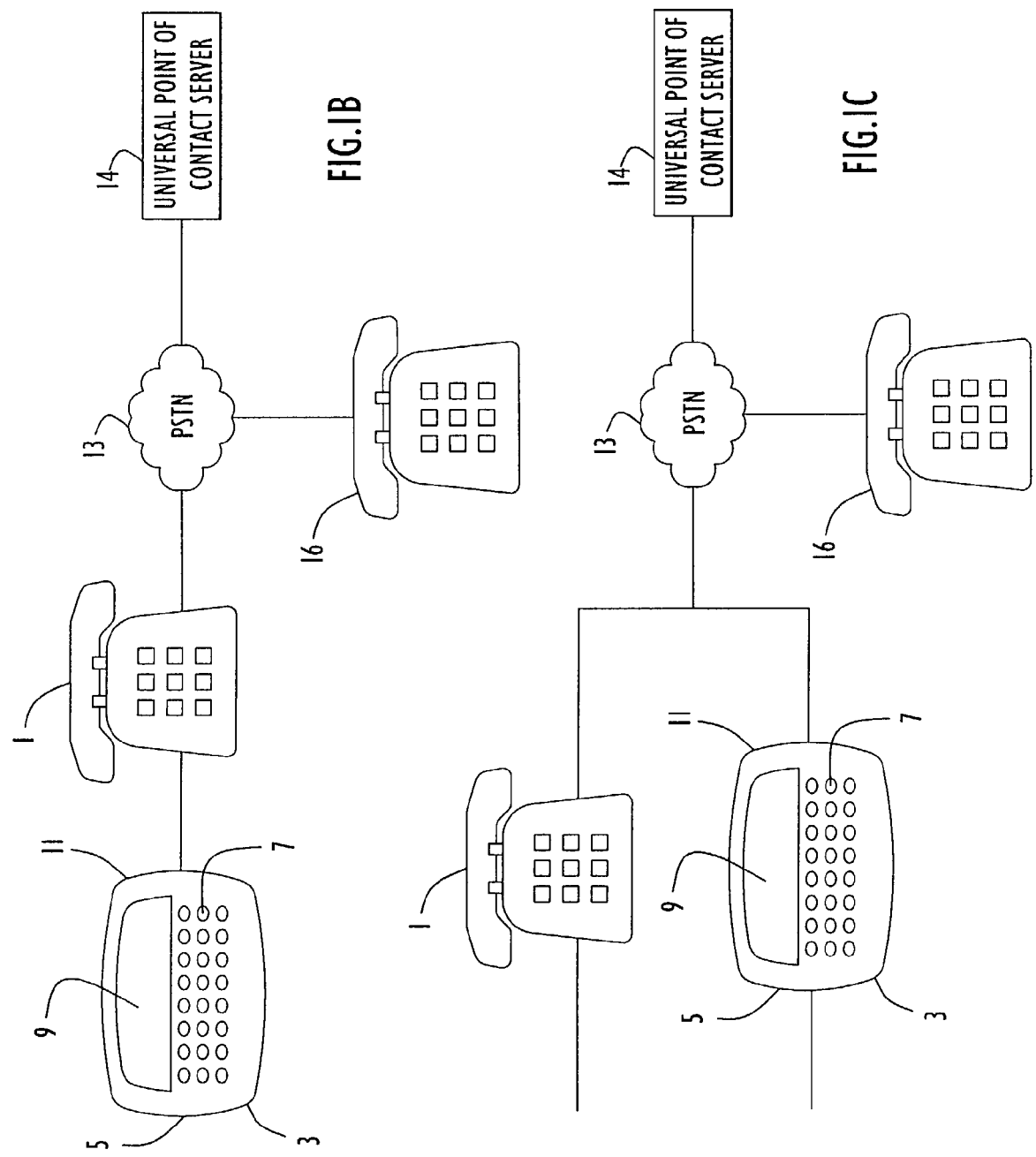

UNIVERSAL POINT OF CONTACT IDENTIFIER SYSTEM CALLING DEVICE AND METHOD

CROSS REFERENCE TO RELATED APPLICATION

This application claims priority from U.S. Provisional Patent Application Ser. No. 60/332,537 entitled "Universal Point of Contact Identifier System Calling Device and Method," filed Nov. 26, 2001. The disclosure of that provisional patent application is incorporated by reference here in its entirety.

BACKGROUND OF THE INVENTION

1. Field of the Invention

The invention relates to devices and methods used to enter alphanumeric information for use with a telephone system.

2. Description of the Related Art

Communication has become a part of everyday life. For some people, being disconnected is a concept that is inexcusable. As a result, it is not unusual for someone to have numerous communication points of contact including home telephone numbers, office telephone numbers, cellular telephone numbers, fax machine numbers, pager numbers and email addresses. The need to consolidate a person's points of contact has been addressed in U.S. patent application Ser. No. 09/873,433, which discloses a universal point of contact (UPOC) identifier system, the disclosure of which is incorporated in its entirety by reference herein. While the universal point of contact identifier system solves the problem of consolidating a person's points of contact to a single identifier, such as an email address, the problem of reliably and conveniently facilitating entering such an identifier remains. For example, entry of an email address consisting of letters, numbers and other symbols such as the "@" symbol, is difficult and confusing, if not impossible using a conventional touch-tone telephone keypad.

SUMMARY OF THE INVENTION

Therefore, in light of the above, and for other reasons that will become apparent when the preferred embodiments are fully described here, a calling device is described herein for communicating with a server to permit the server to establish a connection between a caller and a call recipient over a telephone network, where the server connects a preferred end unit of the caller to a preferred contact device of the call recipient by selecting a connection address for the preferred contact device. The calling device includes an input device including a keypad with alphanumeric characters configured to input an identifier corresponding to the identity of the call recipient, where the identifier is not the connection address of the preferred contact device. The calling device further includes an output unit configured to connect the calling device to the network, a storage medium configured to store the identifier input by the input device as well as a predetermined connection code to connect with the server, a communication unit coupled to the output unit and configured to establish a communication link between the calling device and the server over the network, and a controller coupled to each of the input device, storage medium and communication unit.

The controller is configured to control the communication unit to transmit an initiation signal over the network to the server to establish the communication link between the calling device and the server, where the initiation signal is based on the connection code. The controller is further configured to control the communication unit to transmit a connection request signal over the network to the server in response to establishing the communication link, where the connection request signal includes the identifier. Transmission of the connection request signal facilitates an automatic connection between the preferred end unit of the caller and the preferred contact device of the call recipient over the telephone network. Optionally, the calling device may also be configured to receive information about a subscriber (e.g., a preferred physical address) from the server and display such information via a display in response to transmission of the connection request signal to the server.

The universal point of contact identifier system calling device solves the problem of easily entering a universal point of contact (UPOC) identifier such as an email address. Such a calling device allows a caller to originate calls to entities registered with a universal point of contact identifier system (UPOCIS) by using a universal point of contact (UPOC) identifier.

The above and still further features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

BRIEF DESCRIPTION OF THE DRAWINGS

FIGS. 1A–1D are illustrations of various telephone system configurations employing a universal point of contact calling device showing its connections to other telephone network components.

DETAILED DESCRIPTION

Figure 1A:
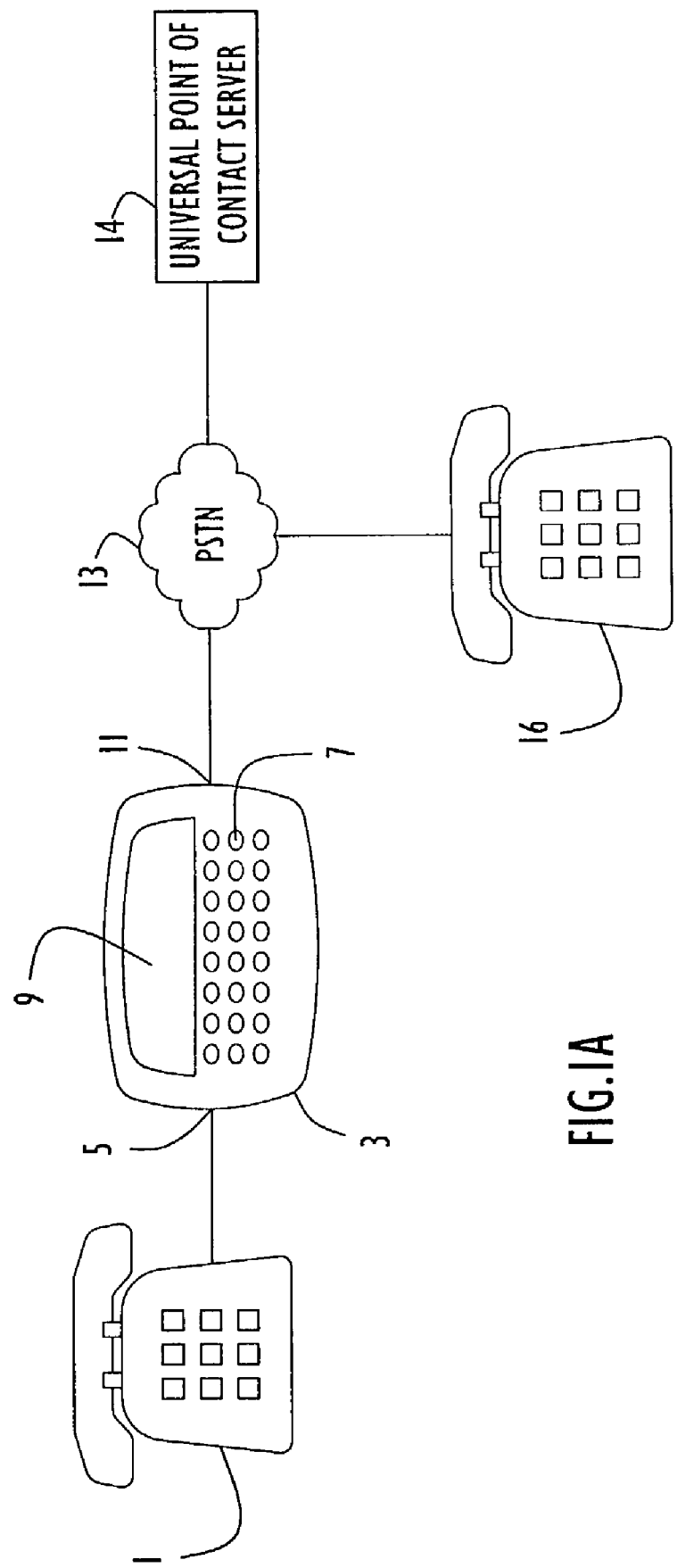

Various embodiments of the present invention are described below with reference to the above drawings, in which like reference numerals designate like components.

Telephone systems that employ a universal point of contact calling device are shown in FIGS. 1A–1D. The universal point of contact device includes an alpha-numeric keyboard, a display, a circuit, such as a modem or appropriately programmed digital signal processor for making a telephone call and transmitting and receiving digital data, an inline telephone connection, a power supply, a micro-controller, a character memory, and a non-volatile memory unit.

Referring to FIG. 1A, a telephone 1 is connected to a universal point of contact calling device 3 by way of a connector unit 5, an example of which is a RJ-11 receptacle. Calling device 3 includes a keyboard 7 and a display unit 9, such as a liquid crystal diode (LCD) or any other suitable display, that provides visual feedback to the caller. Both the keyboard and display are mounted in an enclosure and are accessible to a caller. Another connector unit 11 allows calling device 3 to be connected with a publicly switched telephone network (PSTN) 13. A destination device 16 is also connected with PSTN 13 to facilitate a connection between telephone 1 and device 16 as described below. While destination device 16 is depicted as a telephone, it is noted that the destination device may be any suitable device (e.g., cell phone, facsimile machine, computer, voicemail device, etc.) capable of communicating with and/or receiving information from telephone 1. The destination device may optionally include a universal point of contact calling device substantially similar to calling device 2 to facilitate initiation by device 16 of a connection via server 14 to telephone 1.

Figure 1D:
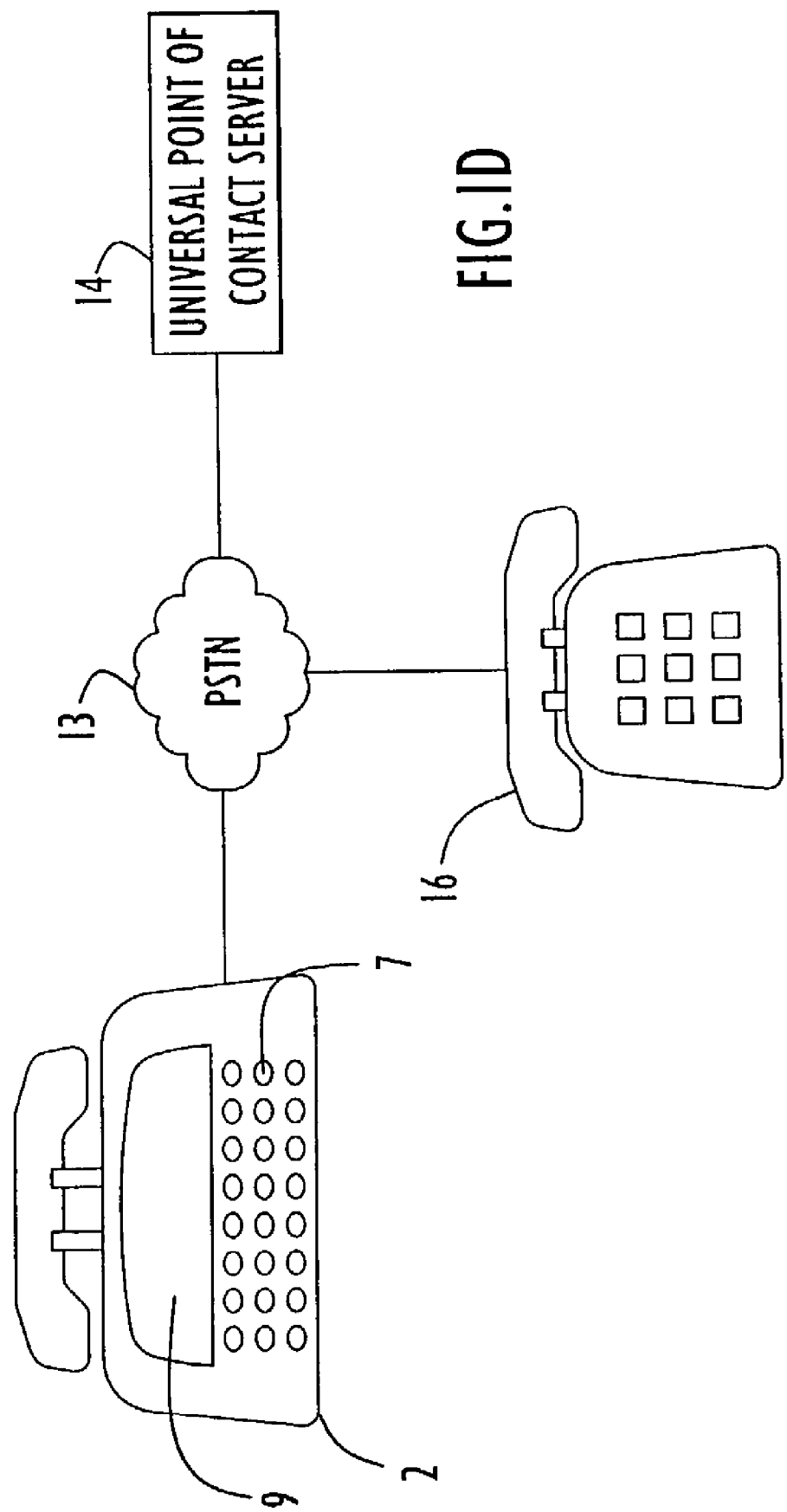

FIG. 1B illustrates an alternative serial configuration of a telephone system using a universal point of contact calling device, in which the telephone 1 and the calling device 3 are connected in a serial arrangement. FIG. 1C illustrates an alternative parallel configuration of the system, in which the telephone 1 and the calling device 3 are connected in a parallel arrangement. In yet another alternative embodiment, FIG. 1D illustrates a configuration in which the universal point of contact calling device and telephone are integrated as a single unit 2, with keyboard 7 and display 9 disposed at suitable locations on the unit for easy access by the caller.

Figure 2:
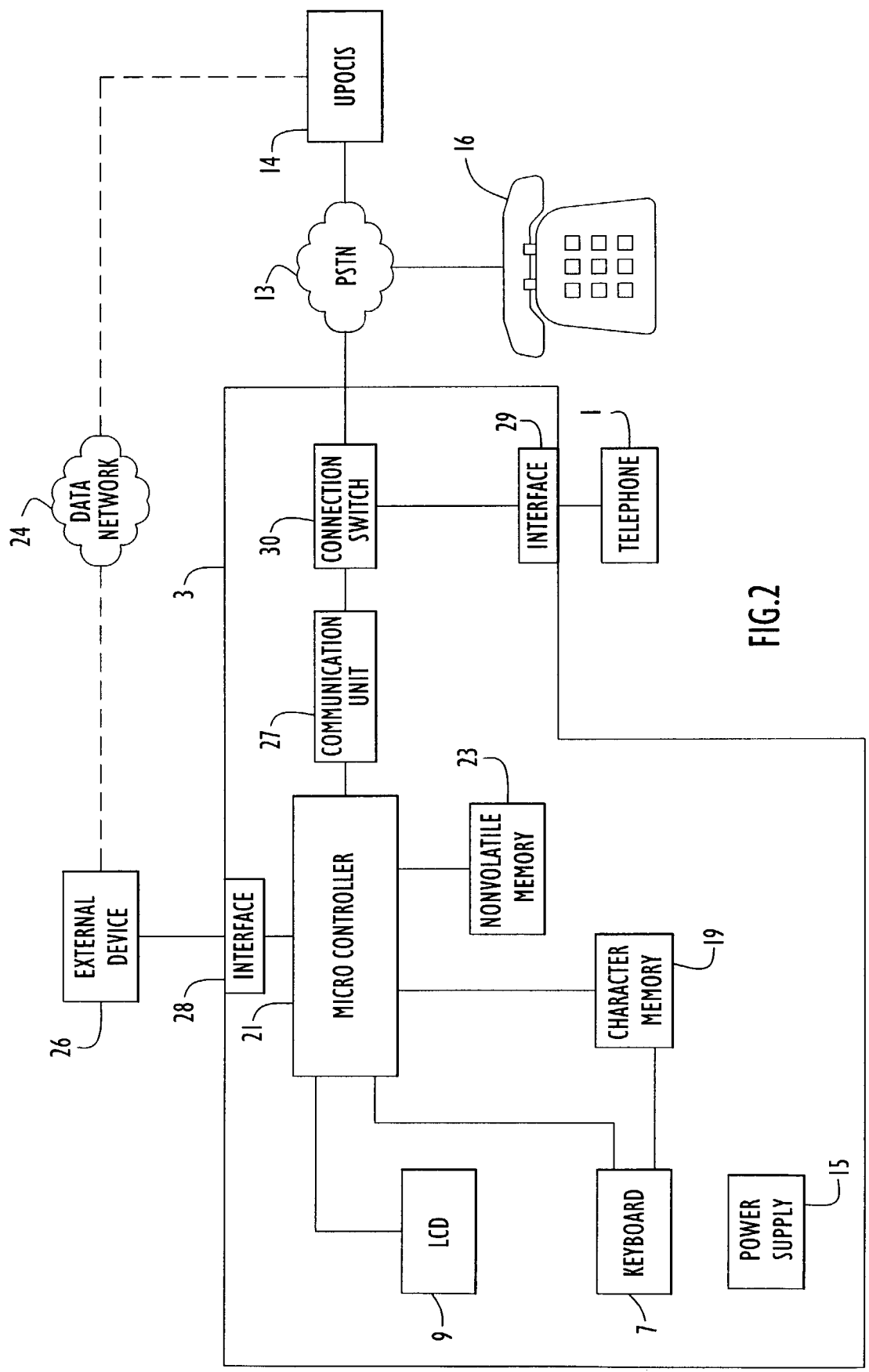
FIG. 2 is a block diagram illustrating a universal point of contact calling device.

FIG. 2 is a block diagram that illustrates the cooperating elements of the calling device 3 in more detail. The calling device can receive power from either the telephone line or from the telephone 1 with which it is connected, or it can have a separate power supply 15. Power supply 15 can be a battery, AC wall connection, solar powered unit or other suitable power source. Keyboard 7 preferably consists of keys for alphanumeric characters, and can also include certain functional keys if desired. Preferably, in FIGS. 1 and 2, the keyboard has a separate key for each letter in the alphabet and number from 0–9. Symbols, such as @, #, *, etc. can be designated on separate keys or can be designated on keys representing other characters, but used in combination with another key, such as a shift key, as with a conventional computer keyboard. The keyboard is used by a caller to enter a UPOC identifier, such as an email address, to initiate a contact with the recipient. The keyboard generates signals, corresponding to the characters a caller enters using the keyboard, that are stored, under control of a microcontroller 21, in a character memory 19. A conventional LCD can be used for display 9, as well as other types of displays. Display 9 displays, under control of the microcontroller 21, caller-entered data and status messages to the caller. Accordingly, when a user enters an email address using the keyboard the characters entered are displayed on display 9.

The micro-controller 21, in response to a user activating a predetermined key, such as a SEND key, retrieves a UPOC identifier from character memory 19, and a preprogrammed server identifier from a non-volatile memory unit 23. Non-volatile memory unit 23 can include an EEPROM (electrically erasable programmable read only memory) that stores a predetermined telephone number of a universal point of contact identifier system (UPOCIS) server 14. Other types of non-volatile memory units can be used, including, but not limited to, flash memory or disk memory, and additional storage space can be provided to store program instructions and data, to include contact options for various recipients, and personal profile options belonging to the caller. Personal profile options indicate the various destinations to which the caller informs the UPOCIS to direct incoming calls routed through the UPOCIS server. The microcontroller further controls display of characters or other information on display 9, e.g., based upon character information input by keyboard 7. In an exemplary embodiment, the microcontroller may include an auto-complete function, as described below, that controls an automatic display of at least one UPOC identifier (or other information associated with the UPOC identifier) on the display in response to entry of a selected number of characters by the user utilizing the keyboard. A conventional microcontroller, such as an embedded processor, can be used for microcontroller 21.

A communication unit 27 in the calling device includes circuitry configured to place a telephone call with the PSTN and transmit and receive data over the PSTN connection. The communication unit 27 can be a modem of conventional configuration, such as a Bell 202 design, or it can be a circuit, such as an appropriately programmed digital signal processor or other dedicated circuitry for interacting with the PSTN. Upon instruction from the micro-controller 21, the communication unit 27 establishes communication with the UPOCIS server by way of PSTN 13 using a dual tone multi-frequency (DTMF) code exchange, as in a conventional telephone call, based on the predetermined telephone number stored in the non-volatile memory unit 23. Once the server 14 answers the call from the calling device 3, a connection between the calling device and the server is established. The calling device 3 then transmits the UPOC identifier to the server 14 via the communication unit using modulated signals, such as a frequency shift keying (FSK) modulation signal or other suitable signaling process. An interface 29 includes a connector unit, which can be a conventional RJ-11 connector, or any other conventional design known to those skilled in the art, for connecting a telephone set 1 to the calling device's communication unit 27 for connection to the telephone line into PSTN 13. The interface 29 can connect the telephone 1 to a connection switch 30 that is controlled by microcontroller 21 to connect the telephone 1 to the telephone line. The microcontroller 21 can be programmed to control the connection switch 30 based upon detecting that a connection is established with the recipient's calling device. In this manner, the telephone 1 is isolated from the PSTN until a connection with the recipient is established or in progress. The microcontroller 21 can be programmed to display a message on the display 9 to indicate that the telephone 1 is connected to the PSTN.

Figure 3:
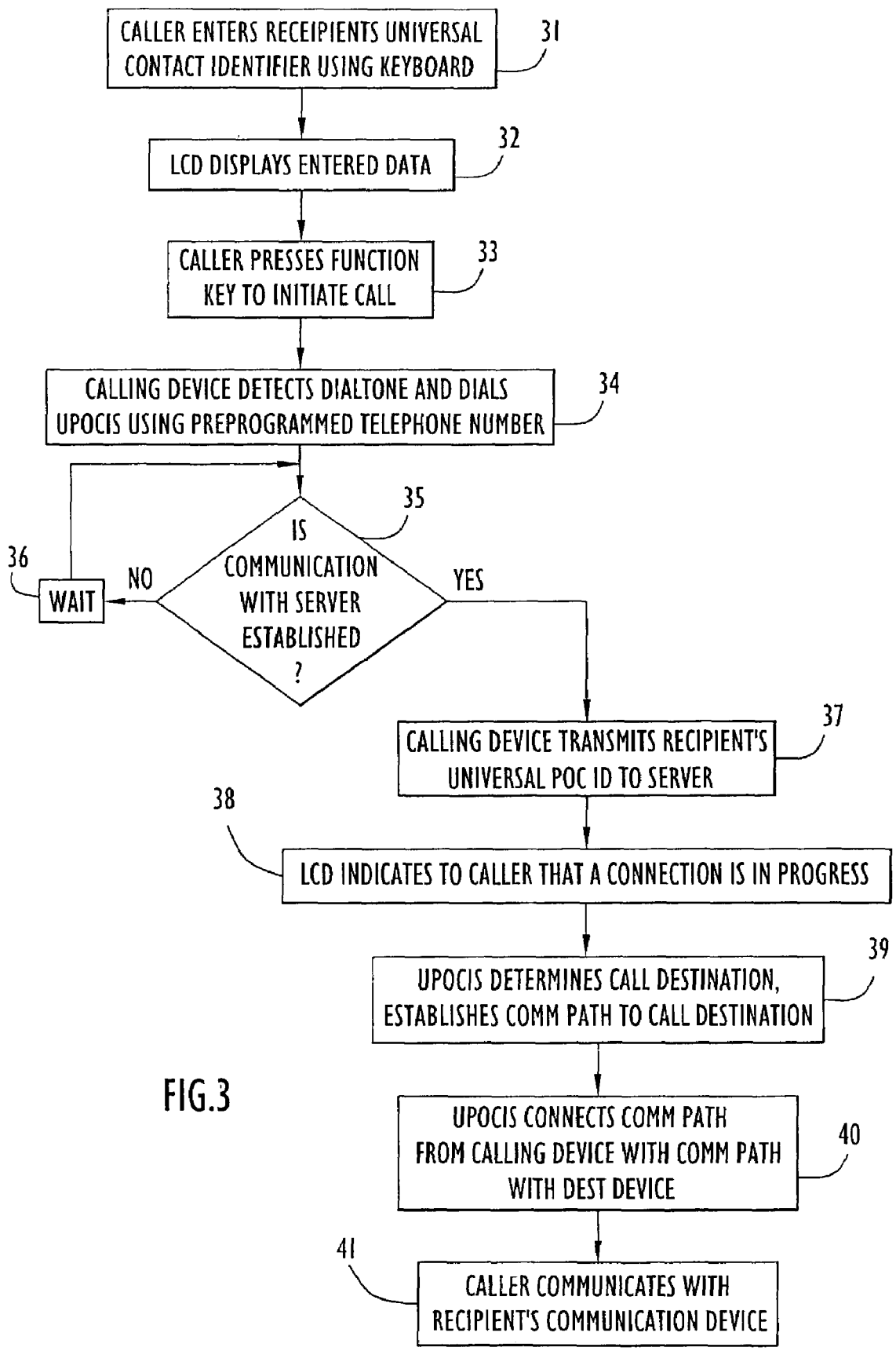
FIG. 3 is a flow chart showing an exemplary process for using the universal point of contact calling device shown in FIG. 2.

Operation of the calling device is illustrated by the flowchart shown in FIG. 3. A caller initiates use of the calling device by entering the UPOC identifier of the call recipient using the keyboard (31). As the caller enters the UPOC identifier, the characters of the UPOC identifier are displayed on the LCD (32). The calling device, upon receiving the initial character entries, can initiate an auto-complete function. In an exemplary embodiment, the calling device offers any known identifiers corresponding to the initial character entries by displaying those identifiers on the display. The caller may select one of the offered identifiers, if appropriate, or continue to enter the desired identifier. For example, the caller, intending to contact a subscriber John Smith, begins entering his UPOC identifier, John.Smith@domainname.com. Upon entering the letters "JOHN" the device displays the UPOC identifier John.Smith@domainname.com, along with any other UPOC identifier beginning with the name "John." The caller then presses the appropriate function key, such as a SEND key, to initiate the call (33). In response to the SEND key being activated, the micro-controller controls the calling device's communication unit 27 to go off-hook, detect a dial tone, and dial the UPOCIS server using a preprogrammed telephone number for the UPOCIS server stored in the non-volatile memory unit (34). The device determines if communication is established with the server (35). If not, the device waits (36) and again checks if communication is established.

When communication with the UPOCIS server is established (35), the calling device transmits the UPOC identifier to the UPOCIS server (37). The microcontroller controls the connection switch to connect the telephone 1 with the telephone line and controls the LCD to display a notification, such as the word "connecting" (38). The caller then picks up the phone and waits for the connection to be completed.

Upon receiving the UPOC identifier, the UPOCIS server determines the call destination and establishes a connection from the UPOCIS server to the call destination (39). The UPOCIS server then connects the communication path from the destination device with the communication path from the calling device, thereby forming a connection between the calling device/telephone set and the destination device (40). The caller then communicates with the call recipient (41). The caller and call recipient typically will be people, however, the caller can be a machine, such as a fax machine, and the call recipient (41) also can be a machine, such as another fax machine.

Alternatively, the calling device can be Internet Protocol (IP) based. In this manner of operation, the calling device can be an external device such as a computer, personal digital assistant (PDA), cellular phone, or any suitable device with access to a data network 24, such as the Internet. Here, the caller enters a UPOC identifier, and a callback number of the phone that the caller wishes to use. Preferably, the calling device determines the appropriate UPOCIS address based on the callback number entered. The appropriate address can depend on proximity, and authorization to use a particular UPOCIS server. Alternatively, the caller can enter the UPOCIS address or otherwise select it from a stored list of UPOCIS addresses. The caller then presses a SEND button, or other button on the external device having a similar function and the calling device connects to the UPOCIS server using the appropriate UPOCIS address by way of the data network. Once the connection to the UPOCIS server is made, the calling device then transmits the UPOC and the callback number to the UPOCIS server. The UPOCIS server then calls the callback number, and establishes a communication path to the UPOC destination. The UPOCIS server then makes a connection between the call destination device and the user's call back telephone. When the call back telephone rings, the caller picks up the telephone to begin a conversation.

The calling device also enables a caller to update a contact profile for incoming calls, and manage the caller's contact lists for outgoing calls. If a caller is a subscriber to a UPOCIS system, he may have one or more profiles stored at the UPOCIS server. For example, a caller may have a home profile, a work profile and a mobile profile. To select a profile using the calling device, the caller presses a predetermined key to initiate the profile management process and the caller selects a profile to update. The caller is prompted to enter his own email address and his personal identification number (PIN). Alternatively that information is stored in the calling device and available for use automatically when a caller wants to manage profiles. The calling device then prompts the caller for changes to the profile, which the caller then enters. After entering the profile changes the caller presses another predetermined key to update the profile. Upon depressing the update key or keys the calling device calls the UPOCIS server and transmits the caller's email address and PIN to log in to the server. Once logged in, the calling device transmits the updated profile information to the server which then updates the profile.

Alternatively, the caller can update a profile on-line, preferably by being connected to the UPOCIS server through a data connection, such as the Internet. By selecting the UPOCIS server as a destination, rather than another individual, and upon being connected to the server the caller then employs the keyboard to select or edit a profile as desired. For example, a caller may enter a UPOC identifier for the server itself or may select a profile update selection item such as an update selection item or icon displayed on the display. The calling device calls the selected UPOCIS server, and the server authenticates the identity of the caller, once the caller enters authenticating information such as a UPOC ID and a PIN. The UPOCIS server controls the calling device to offer a menu to the caller that includes updating the caller's current contact data. The caller can then select the profile appropriate to his current location/status, then exit the system.

The calling device also can be configured to allow a caller to flag, or indicate to the UPOCIS server, the caller's current location, which may or may not be part of a preexisting profile. To flag the caller's location the caller presses a predetermined key, such as a FLAG or location key, that directs the calling device to transmit an indication of the caller's current location to the UPOCIS server 14. For example, a caller may have a preexisting profile for work, but not for the location of a business meeting. Upon arrival at work, the caller presses the predetermined key on the calling device located at the caller's office and the caller's work profile, or a command to select the caller's work profile, is transmitted to the UPOCIS server. The UPOCIS server activates the caller's work profile so calls are directed to the caller's work telephone. Later, when the caller arrives at a meeting at a location that is not part of a preexisting profile, the caller may prefer to have a call sent to a conference room phone, rather than to a cellular phone, or other device. The caller, using another calling device, possibly a cellular telephone, connects to the UPOCIS server as previously described, then enters the number of the location into the calling device, and presses a predetermined key that informs the UPOCIS server to direct the desired call to the location of the meeting.

To manage the caller's contact list, the caller accesses the non-volatile memory unit of the calling device without accessing the server, by pressing a contact list key or a predetermined key sequence, for example. The contact list includes the UPOC identifiers the caller has entered into the memory as an address book of names associated with email addresses, or UPOC identifiers that have been incorporated into the memory as a result of previous contact attempts if the calling device is configured to store UPOC identifiers from previous calls. The caller then uses the keyboard to make desired changes to the contact list.

The caller can also use the UPOC calling device to assist in participating in a conference call (i.e., where the caller engages in a call with multiple parties simultaneously). One way in which a caller can participate in a conference call is by using a conference calling service that establishes the conference call among the conference call participants. In that situation, the conference call service provider distributes a UPOC identifier to each participant. Those identifiers can all be the same or they can be different. The caller joins the conference call by entering the UPOC identifier that was sent to the caller, into the UPOC calling device. The conference call service provider designates a bridge telephone number as the preferred contact point for each UPOC identifier sent to the call participants. In this manner, in response to a caller entering the UPOC identifier for the conference call, the calling device is connected with the conference call bridge and the caller joins the conference call.

By using the UPOC calling device and UPOC identifier the conference call service provider can use any telephone number for the conference call without having to notify the call participants of that number. For example, a conference calling service provider that supports a regularly scheduled conference call might use a different conference telephone number every week to facilitate weekly conference calls between multiple parties of a particular group. Each week the telephone number for that call is designated as the preferred contact point. Thus, each party that is privy to the conference call can easily connect with the conference call by providing the known conference identifier to the UPOCIS server via the UPOC calling device. In this manner, the conferencing parties need not be continuously informed of the changing conference telephone number for each successive conference call.

It will be appreciated that the UPOC calling device can be used with other techniques for making a call to multiple parties. For example, the caller may initiate a call to two recipients utilizing a "three-way" calling feature of the telephone service to which the caller subscribes. The caller makes a first connection with a first call recipient using one of the techniques described above. Next, the caller presses a CONF key, or other key having a similar function, on the UPOC calling device to suspend the first connection while the caller initiates a second connection by entering the UPOC identifier corresponding to a second call recipient. The UPOC calling device proceeds to establish a second connection by calling and transmitting the second identifier to the UPOCIS server. Once the second connection is made, the calling device establishes a three-way call by pressing a FLASH or similar key on the UPOC calling device.

The caller can also connect to an external device 26, shown in FIG. 2, by way of an external device interface 28 to download contact data to the calling device. External device 26 can be a computer, PDA, cellular phone, or other similar data storage device having an electronic address book. Interface 28 can be either a hardwired connection or a wireless connection (e.g. infrared). If desired, the caller can perform any of the previously described functions while connected to the external device.

The calling device also can be automatically updated with new software upon contact with the UPOCIS server. During the handshaking process (e.g., FSK handshaking), the UPOCIS server 14 can notify the calling device of the availability of new software as well as a schedule time for obtaining the update and a telephone number of a maintenance server containing the updated software. The calling device, at the scheduled time, can call the telephone number of the maintenance server to connect to that server and initiate the update.

In addition to the previously described features, the calling device may also be configured to provide certain request information to a UPOCIS subscriber by accessing the server and requesting such information. For example, the calling device can be configured to retrieve information from the server regarding attempts by others to call the subscriber by using the subscriber's UPOC identifier, where the identity of those callers can be provided to assist the subscriber in returning the call. This information can be presented on the calling device in many different ways, such as presenting a list of callers. Such information can also be used to extend the subscriber's contact list to include new contacts.

Additionally, other metrics associated with the subscriber's use of the system and collected by the UPOCIS server can be returned to and displayed on the calling device. The calling device can further include a call-back feature that facilitates making a connection between the subscriber and the caller who initiated the most recent incoming call to the subscriber. The calling device can be configured to maintain a list of any size that includes information concerning the destinations most recently called by the caller.

In situations where the UPOCIS subscriber has more than one preferred connection device associated with a UPOC identifier, a list of the preferred connection devices can be provided to the caller's calling device in response to the calling device transmitting the UPOC identifier to the server. The calling device then prompts the caller to make a selection as to which connection device the caller desires a connection to be made.

The calling device can be configured to support multiple telephone and/or other selected devices (e.g., facsimile machines, PDAs, etc.) for connecting to the PSTN. In addition, the calling device can be configured to receive one or more UPOC identifiers or other information utilizing the device's keyboard or any other suitable device. For example, the calling device may include an embedded voice recognition unit to facilitate vocal input by the user of UPOC identifiers or other information. In such an embodiment, the calling device includes a microphone coupled to the voice recognition unit and to the character memory. Preferably, the voice recognition unit is integrated with the calling device, controlled by the microcontroller 21, and capable of storing a UPOC identifier, spoken by the caller, into the character memory 19. The calling device can be configured to convert the spoken UPOC identifier into text for displaying to the caller on the display and for entering the UPOC identifier into the character memory. In this manner, the call to the UPOCIS server is placed by the caller inputting the UPOC identifier of the call recipient into the calling device by speaking the identifier into the microphone. The calling device then initiates the call using the UPOC identifier stored in the character memory as previously discussed.

In an alternative embodiment, the calling device can be configured to receive physical point of contact address information from the UPOCIS server. As described in U.S. patent application Ser. No. 09/873,433, the UPOCIS server may provide physical address information, such as a postal address, that a subscriber desires to make available to a caller. The calling device may be configured to receive the physical address information of the subscriber from the server, after transmission of the UPOC identifier to the server, and display such information to the caller.

This feature of the calling device is useful for providing a shipper, such as an overnight delivery service provider, with timely information about a subscriber's preferred physical address and, optionally, a preferred voice address (e.g., a home telephone number or cell phone number). Here, the subscriber grants the shipper access to the subscriber's preferred postal and voice addresses by providing the appropriate UPOC identifier to the shipper. The shipper then accesses the subscriber's preferred shipping address and, if necessary, the subscriber's preferred voice address from the UPOC server utilizing the calling device. The server, upon receiving the request, retrieves the physical address that is designated as the preferred physical address for deliveries, and returns it, and optionally the preferred voice address, to the calling device for the shipper's use. The shipper then sends the package to that preferred physical address. This feature benefits both the shipper and the consumer, particularly in situations in which the consumer had recently moved to a new address, because the shipper has the most current, and hence, likely the most accurate address for the consumer. In addition, the consumer gets the package delivered to the address he or she prefers.

It will be understood that the invention can be practiced using computer programmable devices, and with using hardware and/or software designed to operate according to the descriptions here. For example, the calling device 3, shown in FIG. 2 can be implemented with an appropriately programmed computer or a cellular telephone.

Having described preferred embodiments of universal point of contact systems and methods, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A calling device for communicating with a server to permit the server to establish a connection between a caller and a call recipient over a telephone network, wherein the server connects a preferred end unit of the caller to a preferred contact device of the call recipient by selecting a connection address for the preferred contact device, the calling device comprising:
    an input device including a keypad with alphanumeric characters configured to input an identifier corresponding to the call recipient, wherein the identifier is not the connection address of the preferred contact device;
    an output unit configured to connect the calling device to the network;
    a storage medium configured to store the identifier input by the input device and a predetermined connection code to connect with the server;
    a communication unit coupled to the output unit and configured to establish a communication link between the calling device and the server over the network; and
    a controller coupled to each of the input device, the storage medium and the communication unit, the controller being configured to control the communication unit to:
    transmit an initiation signal over the network to the server to establish the communication link between the calling device and the server, wherein the initiation signal is based on the connection code; and
    transmit a connection request signal over the network to the server in response to establishing the communication link, wherein the connection request signal includes the identifier;
    wherein transmission of the connection request signal facilitates an automatic connection between the preferred end unit of the caller and the preferred contact device of the call recipient over the telephone; and
    wherein the preferred end unit of the caller is a telephone, the output unit is coupled to the telephone, the calling device includes a connection switch coupled between the output unit and the telephone, and the controller is further configured to control the connection switch to connect the telephone to the network in response to transmission of the connection request signal by the communication unit.

2. The calling device of claim 1, wherein the keypad of the input device facilitates input of an email address of the call recipient as the identifier.

3. The calling device of claim 2, wherein the email address includes a user identification portion, a domain name portion and a demarcation symbol between the user identification portion and the domain name portion.

4. The calling device of claim 3, wherein the email address is of the form userid@domainname, wherein userid is the user identification portion which is an identifier for the person within a computing domain having the domain name portion designated by domainname.

5. The calling device of claim 1, wherein the keypad of the input device facilitates input of at least one character as the identifier, the at least one character being selected from the group consisting of alphabetic characters, numeric characters and combinations thereof.

6. The calling device of claim 1, wherein the connection between the preferred end unit of the caller and the preferred contact device of the call recipient is a telephony connection.

7. The calling device of claim 1, wherein the communication unit is configured to transmit the initiation signal using a first communication protocol that is different from a second communication protocol that is used to transmit the connection request signal.

8. The calling device of claim 7, wherein the communication unit is configured to transmit the initiation signal as a dual tone multi-frequency (DTMF) code exchange.

9. The calling device of claim 8, wherein the communication unit is configured to transmit the connection request signal as a frequency shift keying (FSK) modulation signal.

10. The calling device of claim 1, wherein the storage medium includes a character memory configured to store the identifier input by the input device and a nonvolatile memory unit configured to store the connection code.

11. The calling device of claim 1, further comprising:
    a display configured to provide feedback information to the caller including at least one of the identifier input by the input device and an indication that a connection exists between the preferred end unit of the caller and the preferred contact device of the call recipient.

12. The calling device of claim 1, wherein the input device further includes an activation key, and the controller is further configured to control the communication unit to transmit the initiation signal in response to activating the activation key.

13. The calling device of claim 1, wherein the connection request signal further includes a connection address of the preferred end unit of the caller.

14. The calling device of claim 13, wherein the keypad of the input device is further configured to input the connection address of the preferred end unit of the caller for inclusion in the connection request signal.

15. The calling device of claim 14, wherein the storage medium is further configured to store a predetermined caller profile and a plurality of connection addresses corresponding to a plurality of end units of the caller, and the controller is further configured to select a connection address for the preferred end unit of the caller from the storage medium for inclusion in the connection request signal based upon the predetermined caller profile.

16. The calling device of claim 1, wherein the storage medium is further configured to store a plurality of identifiers associated with different call recipients, and the controller is further configured to select a desired identifier stored in the storage medium for inclusion in the connection request signal based upon a selected input of at least one character from the keypad of the input device.

17. The calling device of claim 1, wherein the input device includes a microphone, and the calling device further includes a voice recognition unit coupled to the microphone and the storage medium, wherein the voice recognition unit is configured to convert a spoken identifier corresponding to the call recipient and received from the microphone into a text identifier and storing the text identifier in the character memory.

18. The calling device of claim 1, wherein the controller is further configured to control the communication unit to send a plurality of connection request signals including identifiers associated with different call recipients to the server so as to facilitate at least one automatic connection between the preferred end unit of the caller and preferred contact devices of at least two call recipients.

19. The calling device of claim 1, wherein each of the preferred end unit and the preferred contact device is selected from the group consisting of a telephone and a facsimile machine.

20. The calling device of claim 1, wherein the calling device is separate from the preferred end unit.

21. The calling device of claim 1, wherein the calling device is integrated with the preferred end unit.

22. A method of establishing a connection between a preferred end unit of a caller and a preferred contact device of a call recipient over a telephone network utilizing a calling device communicating with a server over the network, wherein the calling device includes an input device with an alphanumeric keypad and a storage medium, the method comprising:
    entering an identifier corresponding to the call recipient into the storage medium of the calling device utilizing the keypad of the input device, wherein the identifier is not a connection address of the preferred contact device;
    transmitting an initiation signal from the calling device to the server over the network to establish a communication link between the calling device and the server; and
    in response to establishing the communication link between the calling device and the server, transmitting a connection request signal from the calling device to the server, wherein the connection request signal includes the identifier;
    wherein, in response to transmission of the connection request signal, a connection between the preferred end unit of the caller and the preferred contact device of the call recipient is automatically achieved over the network; and
    wherein the preferred end unit of the caller is a telephone, the calling device is coupled to the telephone and further includes a connection switch to alternate connection between the calling device and the telephone to the network, the method further comprising: connecting the telephone to the network in response to transmission of the connection request signal.

23. The method of claim 22, wherein the initiation signal is transmitted using a first communication protocol that differs from a second communication protocol that is used to transmit the connection request signal.

24. The method of claim 22, wherein the initiation signal is transmitted as a dual tone multi-frequency (DTMF) code exchange.

25. The method of claim 24, wherein the connection request signal is transmitted as a frequency shift keying (FSK) modulation signal.

26. The method of claim 22, wherein the entered identifier includes an email address of the call recipient.

27. The method of claim 26, wherein the email address includes a user identification portion, a domain name portion and a demarcation symbol between the user identification portion and the domain name portion.

28. The method of claim 27, wherein the email address is of the form userid@domainname, wherein userid is the user identification portion which is an identifier for the person within a computing domain having the domain name portion designated by domainname.

29. The method of claim 22, wherein the entered identifier comprises at least one character selected from the group consisting of alphabetic characters, numeric characters and combinations thereof.

30. The method of claim 22, wherein the connection between the preferred end unit of the caller and the preferred contact device of the call recipient is a telephony connection.

31. The method of claim 22, wherein the calling device further includes a display, and the method further comprises:
    providing feedback information to the caller via the display, wherein the feedback information includes at least one of the entered identifier and an indication that a connection is being achieved between the preferred end unit of the caller and the preferred contact device of the call recipient.

32. The method of claim 22, wherein the keypad of the input device includes an activation key, and the method further comprises:
    activating the activation key to facilitate transmission of the initiation signal from the calling device to the server over the network.

33. The method of claim 22, wherein the connection request signal further includes a connection address for the preferred end unit of the caller.

34. The method of claim 33, further comprising:
    entering the connection address for the preferred end unit of the caller into the storage medium of the calling device utilizing the keypad of the input device.

35. The method of claim 33, further comprising:
    determining the connection address for the preferred end unit of the caller based upon a predetermined caller profile stored within the storage medium of the calling device.

36. The method of claim 22, wherein a plurality of identifiers associated with different call recipients is stored within the storage medium of the calling device, and the entering of an identifier includes entering at least one character utilizing the keypad of the input device to designate a desired identifier stored within the storage medium for inclusion in the connection request signal to be transmitted by the calling device to the server.

37. The method of claim 22, wherein the transmitting a connection request signal from the calling device to the server includes:
    transmitting a plurality of connection request signals from the calling device to the server, wherein each connection request signal includes a different identifier corresponding to a different call recipient; and,
    wherein, in response to transmission of the plurality of connection request signals, at least one connection is automatically achieved between the preferred end unit of the caller and preferred contact devices of at least two call recipients.

38. The method of claim 22, wherein each part of the preferred end unit and the preferred contact device is selected from the group consisting of a telephone and a facsimile machine.

39. The method of claim 22, wherein the calling device is separate from the preferred end unit.

40. The method of claim 22, wherein the calling device is integrated with the preferred end unit.

41. The method of claim 22, further comprising receiving from the server information concerning the caller's use of the calling device.

42. A calling device for communicating with a server to permit the server to establish a connection between a caller and a call recipient over a telephone network, wherein the server connects a preferred end unit of the caller to a preferred contact device of the call recipient by selecting a connection address for the preferred contact device, the calling device comprising:
   means for inputting an identifier corresponding to the call recipient, wherein the identifier is not the connection address for the preferred contact device;
   means for storing the identifier and a connection code to connect with the server; and
   means for transmitting a plurality of signals from the calling device to the server over the network, wherein the plurality of signals includes:
   an initiation signal based on the connection code to establish a communication link between the calling device and the server; and
   a connection request signal transmitted in response to establishing the communication link between the calling device and the server, the connection request signal including the identifier;
   wherein transmission of the connection request signal facilitates automatic connection between the preferred end unit of the caller and the preferred contact device of the call recipient over the network; and
   wherein the preferred end unit of the caller is a telephone, the output unit is coupled to the telephone, the calling device includes a connection switch coupled between the output unit and the telephone, and the controller is further configured to control the connection switch to connect the telephone to the network in response to transmission of the connection request signal by the communication unit.

43. The calling device of claim 42, wherein the means for inputting an identifier includes means for facilitating input of an email address of the call recipient.

44. The calling device of claim 43, wherein the email address includes a user identification portion, a domain name portion and a demarcation symbol between the user identification portion and the domain name portion.

45. The calling device of claim 44, wherein the email address is of the form userid@domainname, wherein userid is the user identification portion which is an identifier for the person within a computing domain having the domain name portion designated by domainname.

* * * * *